(12) United States Patent
Telakowski et al.

(10) Patent No.: US 8,729,751 B2
(45) Date of Patent: May 20, 2014

(54) HEAT TRANSFER ASSEMBLY FOR ELECTRIC MOTOR ROTOR

(75) Inventors: Robert Telakowski, Windsor Locks, CT (US); Debabrata Pal, Hoffman Estates, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 647 days.

(21) Appl. No.: 12/943,759

(22) Filed: Nov. 10, 2010

(65) Prior Publication Data

US 2012/0112578 A1  May 10, 2012

(51) Int. Cl.
*H02K 1/32* (2006.01)
*H02K 9/06* (2006.01)

(52) U.S. Cl.
USPC ................................ 310/61; 310/62; 310/64

(58) Field of Classification Search
USPC ............. 310/61, 62, 64, 65; 165/10, 154, 183
See application file for complete search history.

(56) References Cited

U.S. PATENT DOCUMENTS

| 7,225,859 B2* | 6/2007 | Mochizuki et al. ............. 165/10 |
| 7,791,238 B2 | 9/2010 | Pal et al. | |
| 2005/0150639 A1* | 7/2005 | Iwasaki et al. ................ 165/140 |
| 2008/0142319 A1* | 6/2008 | Manter ................... 188/218 XL |
| 2008/0265699 A1 | 10/2008 | Devine | |

FOREIGN PATENT DOCUMENTS

| CN | 101413440 A | 4/2009 |
| DE | 102008043367 A1 | 5/2010 |
| JP | 59-129355 U | 8/1984 |
| JP | H0739275 U | 7/1995 |
| JP | 8243878 A | 9/1996 |
| JP | 2008125234 A * | 5/2008 |

OTHER PUBLICATIONS

Machine translation of DE 10-2008-043367 Apr. 2013.*
Machine translation of JP 2008-125234 Apr. 2013.*
Extended European Search Report for EP Application Serial No. 11190000.7, mailed on Aug. 7, 2012, 6 pages.

* cited by examiner

*Primary Examiner* — John K Kim
*Assistant Examiner* — David Scheuermann
(74) *Attorney, Agent, or Firm* — Kinney & Lange, P.A.

(57) ABSTRACT

A motor driven assembly comprises a motor shaft, a rotor, a passage, and a corrugated fin heat transfer structure. The motor shaft is mounted for rotation about a rotational axis. The rotor is located radially about the shaft. The passage extends through the rotor alongside the motor shaft. The corrugated fin heat transfer structure is disposed within the passage radially aligned with the rotor.

20 Claims, 5 Drawing Sheets

HEAT TRANSFER ASSEMBLY FOR ELECTRIC MOTOR ROTOR

BACKGROUND

The present invention is directed generally to cooling systems for electric motors. More particularly, the present invention is directed to heat transfer assemblies for shaft and hub arrangements in motor rotors.

Electric motors typically comprise a stator element and a rotor element that interact electro-magnetically to convert electric power to mechanical power. For example, a conventional stator element comprises an annular housing having windings of copper coils circumferentially oriented. A conventional motor rotor element is mounted on a shaft. Electric current is passed through the stator windings to generate an electro-magnetic field that causes the rotor hub to rotate about the axis of the shaft. The electric current causes resistance heating of the coils, which heats the entire electric motor including the rotor. In particular, high power electric motors that operate at high speeds and are compact in size generate high heat densities.

Conventional schemes for cooling electric motors involve passing cooling fluid over the stator, which is typically easy to accomplish because of the stationary and exterior nature of the stator assembly. Rotors are typically cooled by passing cooling fluid between the stator and rotor. Such cooling schemes, however, often provide inadequate cooling for rotors used in high power motors due to high rotor heat density. In addition, as the size of high power motors decreases, the available area for passing cooing air between the stator and rotor also decreases. There is therefore a need to improve cooling efficiency in electric motor rotors.

SUMMARY

A motor driven assembly comprises a motor shaft, a motor rotor, a passage, and a corrugated heat transfer fin structure. The motor shaft is mounted for rotation about a rotational axis. The motor rotor is located radially about the shaft. The passage extends through the rotor alongside the motor shaft. The corrugated fin heat transfer structure is disposed within the passage radially aligned with the rotor.

DETAILED DESCRIPTION

Figure 1:
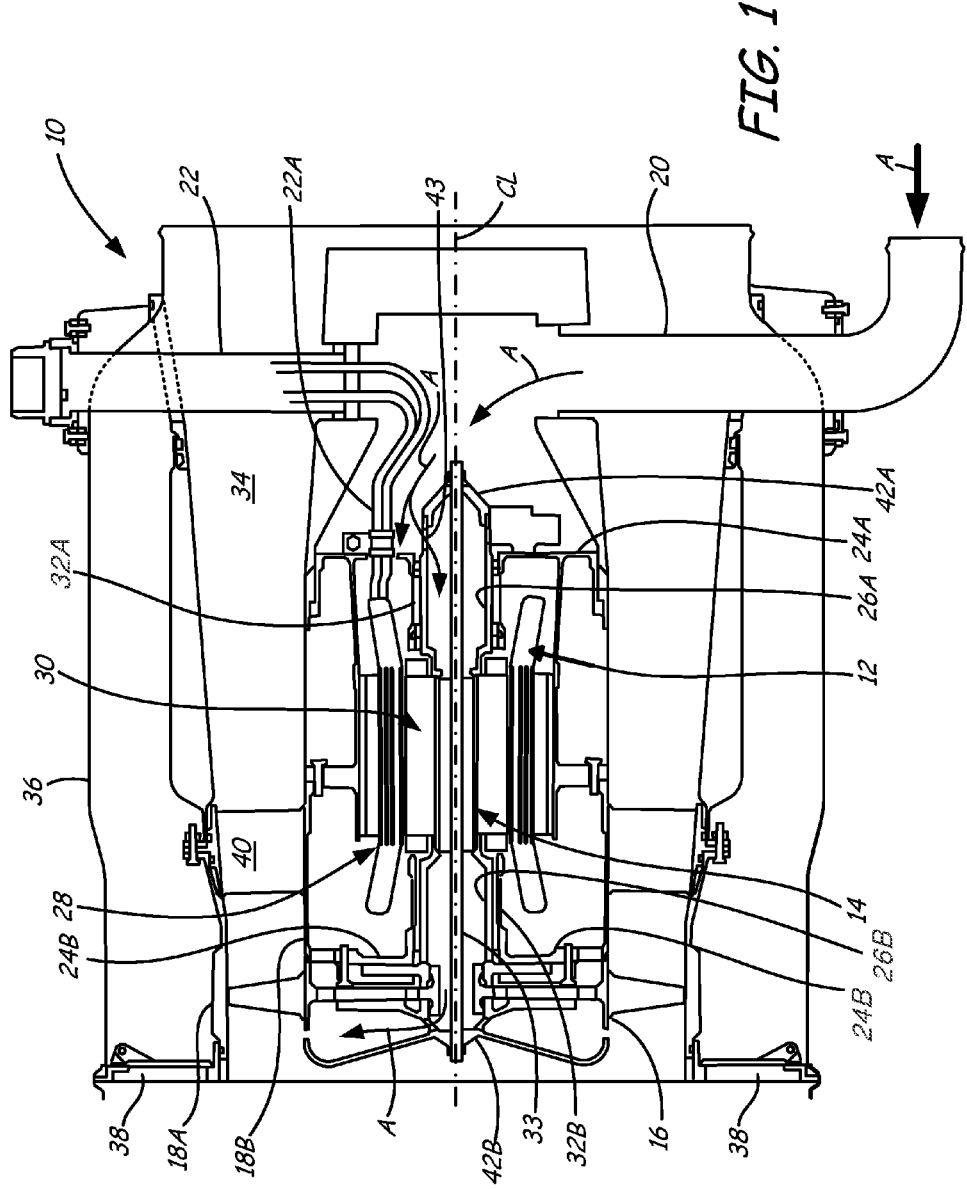
FIG. 1 is a side cross-sectional view of a fan assembly having an electric motor in which a heat transfer assembly of the present invention is incorporated.

FIG. 1 is a side cross-sectional view of fan assembly 10 having electric motor 12 in which heat transfer assembly 14 of the present invention is incorporated. Fan assembly 10 includes fan impeller 16, outer housing 18A, inner housing 18B, air tube 20, electrical conduit 22 and motor supports 24A and 24B. Electric motor 12 includes shafts 26A and 26B, stator 28 and motor rotor 30. Shaft 26A is mounted to motor support 24A within housing 18B by bearing assembly 32A and tie rod 33. Shaft 26B is mounted to motor support 24B within housing 18B by bearing assembly 32B. Outer housing 18A comprises an annular duct in which fan impeller 16 is disposed to drive air through duct 34 around inner housing 18B. Bypass duct 36 is mounted to the exterior of outer housing 18A. Bypass duct 36, in conjunction with bypass valve 38, permits air to bypass fan impeller 16. Bypass duct 36, outer housing 18A and inner housing 18B extend generally axially and concentrically along center line CL. Electrical conduit 22 allows access through housing 18A and housing 18B to stator 28 for connection of electric power. Air tube 20 allows air A from an outside source to access heat transfer assembly 14 to provide cooling of electric motor 12. Fan assembly 10 is configured for use in a ram air duct for an aircraft, but can be used in other applications. Similarly, electric motor 12 is configured for use in fan assembly 10, but can be used to drive other types of systems.

Inner housing 18B is concentrically mounted within outer housing 18A by support structure such as guide vanes 40. Motor supports 24A and 24B are mounted to a radially inward facing surface of inner housing 18B and include portions for supporting stator 28 and bearing assemblies 32A and 32B. Stator 28 and bearing assemblies 32A and 32B are mounted to radially inward facing surfaces of motor supports 24A and 24B. Shaft 26A and shaft 26B are positioned within bearing assemblies 32A and 32B and extend axially and concentrically with center line CL. Tie rod 33 extends through shafts 26A and 26B from first end cap 42A to second end cap 42B. End cap 42B connects fan impeller 16 to shafts 26A and 26B. Motor rotor 30 is mounted to a radially outward facing surface of shaft 26A to face toward stator 28. A small gap is provided between motor rotor 30 and stator 28 to permit cooling air A from air tube 20 to flow through electric motor 12. Electrical wiring 22A extends through electrical conduit 22 and connects to stator 28 to energize coil windings with electrical current. The energized coil windings exert an electro-magnetic flux field on motor rotor 30. The flux field causes motor rotor 30 to rotate about central axis CL on shaft 26A. Tie rod 33 rotates with shafts 26A and 26B and motor rotor 30. Shafts 26A and 26B and motor rotor 30 rotate on bearing assemblies 32A and 32B and cause fan impeller 16 to rotate in duct 34, pushing air between housings 18A and 18B.

The electric current provided to stator 28 generates heat within electric motor 12. Cooling air A flows around the outer surface of stator 28 within housing 18B. Cooling air A also flows along the inner surface of stator 28 and the outer surface of motor rotor 30 in the gap between such components. Cooling air A is also permitted to enter shaft 26A and shaft 26B through opening 43 that permits flow along the interior of motor rotor 30. Heat transfer assembly 14 of the present invention improves the removal of heat from motor rotor 30. Heat transfer assembly 14 comprises a corrugated fin sheet attached to the interior of shaft 26A, as is discussed in greater detail with respect to FIG. 2.

Figure 2:
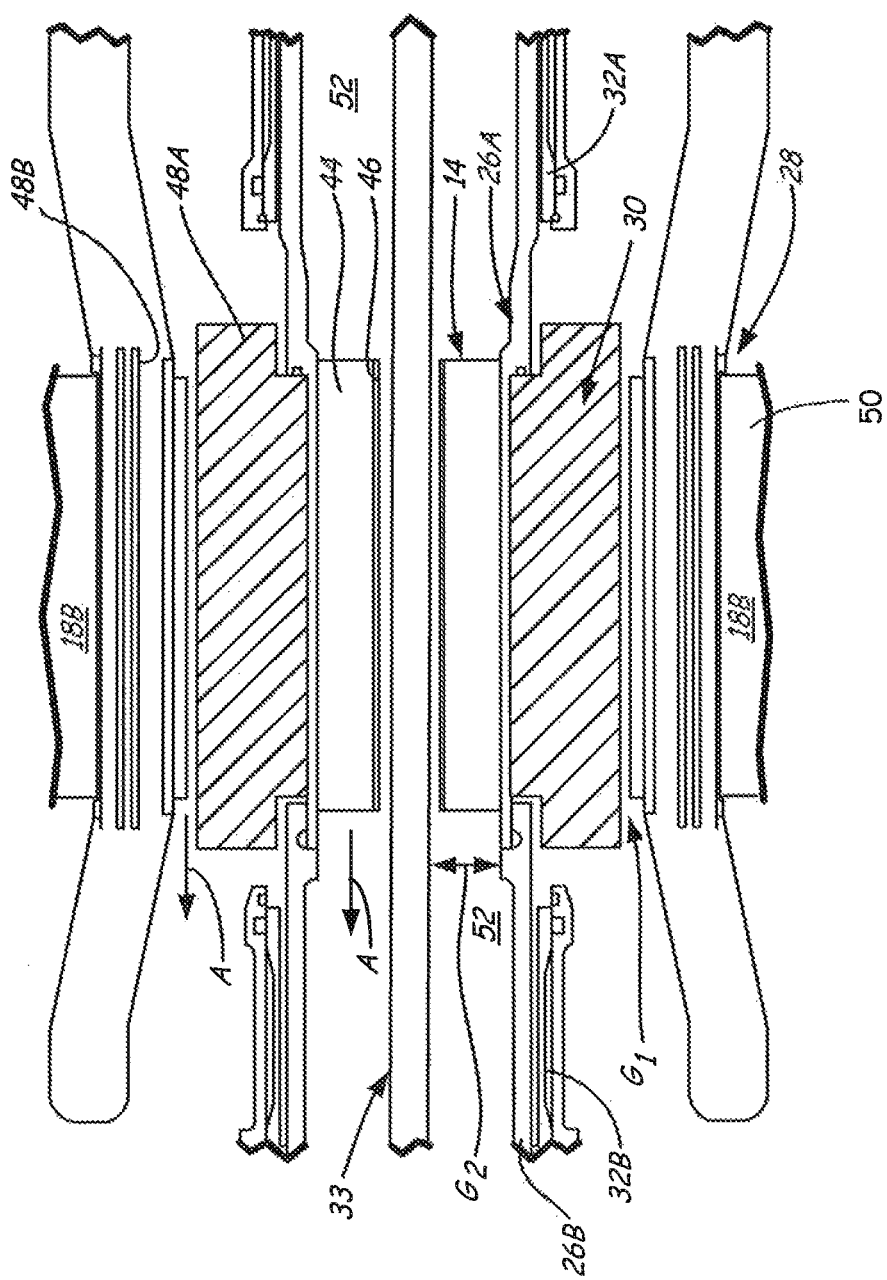
FIG. 2 shows a close-up view of the heat transfer assembly of FIG. 1 as installed in an electric motor rotor.

FIG. 2 shows a close-up view of heat transfer assembly 14 of FIG. 1 as installed in motor rotor 30 of electric motor 12. Electric motor 12 includes shafts 26A and 26B, stator 28, motor rotor 30, bearing assemblies 32A and 32B and tie rod 33. Heat transfer assembly 14 includes fin structure 44 and liner 46. Motor 28 includes rotor component 48A and stator 28 includes magneto-electric drive component 48B. In the disclosed embodiment, rotor component 48A comprises magnetically permeable material and magneto-electric drive component 48B comprises coil windings, as is known in the art to form an induction motor. In other embodiments, rotor component 48A and magneto-electric drive component 48B can be configured to form a permanent magnet motor or a switched reluctance motor, as are known in the art.

As discussed with reference to FIG. 1, shafts 26A and 26B are configured to rotate on bearing assemblies 32A and 32B, which are supported within housing 18B by motor supports 24A and 24B (FIG. 1). Motor rotor 30 is mounted to a radially outer surface of shaft 26A to oppose stator 28, which is mounted to a radially inner surface of housing 18B on pedestals 50. Gap $G_1$ is provided between stator 28 and motor rotor 30 to permit rotation of motor rotor 30. Gap $G_1$ also allows air A to pass along stator 28 and motor rotor 30 to provide convective cooling. Air A is also permitted into shaft 26A to provide additional convective cooling of heat transfer assembly 14. Although the invention is described with respect to the use of cooling air A, other cooling fluids, such as liquid or gas, may be used in other embodiments.

Shafts 26A and 26B comprise annular bodies having internal passage 52 that extends axial along center line CL. Tie rod 33 extends through passage 52 concentrically with shafts 26A and 26B along center line CL. The diameter of tie rod 33 is smaller than that of passage 52 such that gap $G_2$ is present between tie rod 33 and shafts 26A and 26B, which permits air A to pass through passage 52. Fin structure 44 of heat transfer assembly 14 is positioned within passage 52 to increase the cooling effectiveness of air A. Fin structure 44 comprises a corrugated fin sheet wrapped into an annular ring. The outer diameter end of fin structure 44 is affixed to shaft 26A adjacent to rotor component 48A of motor rotor 30. Liner 46 is affixed to the inner diameter end of fin structure 44. Heat generated by operation of electric motor 12 accumulates in rotor component 48A. Fin structure 44 pulls heat out of rotor component 48A through conduction. Air A removes heat from fin structure 44 through convection. As shown in FIG. 1, air A continues through shaft 26B and out of end cap 42B to pass into duct 34 and out of fan assembly 10. As discussed with reference to FIGS. 3A-4B, fin structure 44 is configured to maximize convective and conductive heat transfer between shaft 26A and air A.

Figure 3A:
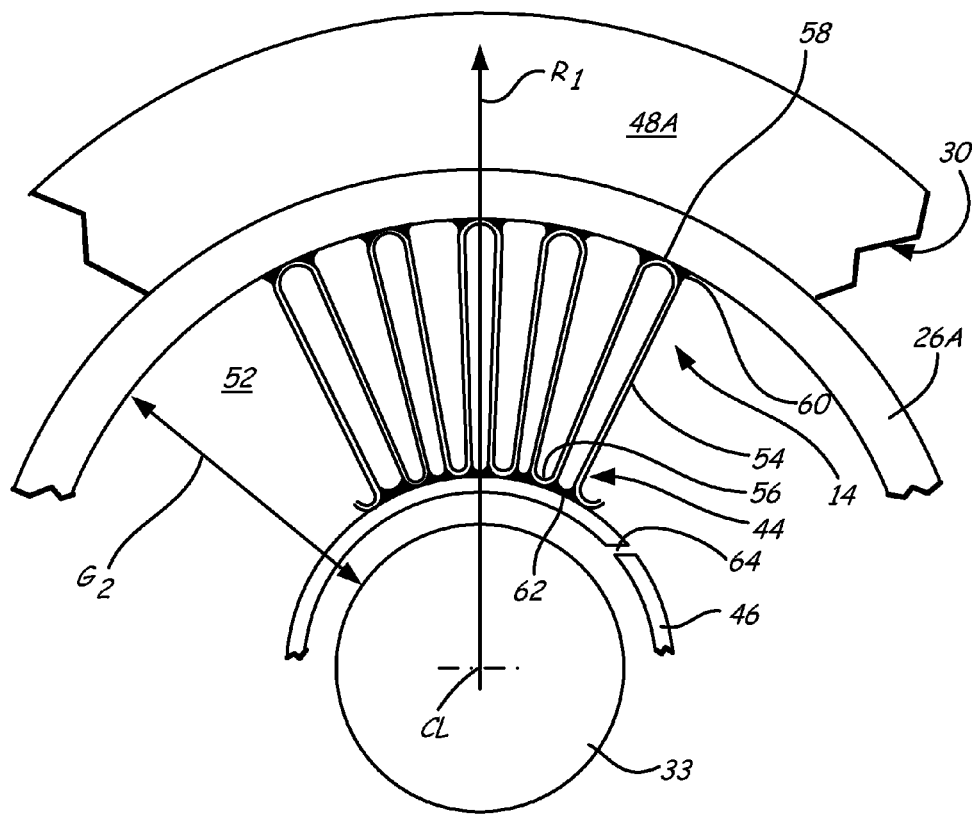
FIG. 3A is an end view of the electric motor rotor of FIG. 2 in which corrugated fins of the heat transfer assembly are shown extending in a true radial orientation.

FIG. 3A is an end view of electric motor rotor 30 of FIG. 2 in which fin structure 44 of heat transfer assembly 14 is shown extending in a true radial orientation. Tie rod 33 comprises a cylindrical body that extends axially along center line CL. Shaft 26A comprises an annular structure that extends axially along center line CL concentric with tie rod 33. Gap $G_2$ extends between tie rod 33 and shaft 26A. Rotor component 48A of motor rotor 30 is mounted to the exterior of shaft 26A. In one embodiment, shaft 26A is force fit into motor rotor 30. Fin structure 44 of heat transfer assembly 14 is mounted to the interior of shaft 26A and occupies a substantial portion of the height of gap $G_2$. Liner 46 of heat transfer assembly 14 is mounted to the interior of fin structure 44. A small gap is maintained between tie rod 33 and liner 46 to facilitate assembly of heat transfer assembly 14 and to prevent engagement of or otherwise interfering with tie rod 33.

Fin structure 44 of heat transfer assembly 14 comprises a corrugated fin sheet that forms a plurality of loops 54 having troughs 56 and crests 58. Crests 58 form the radial outer ends of loops 54 and are metallurgically attached to shaft 26A at joints 60. Troughs 56 form the radial inner ends of loops 54 and are metallurgically attached to liner 46 at joints 62. In one embodiment, shaft 26A and liner 46 are comprised of steel or a steel alloy and fin structure 44 is comprised of nickel or a nickel alloy. In such an embodiment fin structure 44 is brazed to shaft 26A and liner 46.

In other embodiments, fin structure 44 is comprised of aluminum or an aluminum alloy. In such an embodiment, an outer diameter liner would be provided at crests 58 to facilitate attachment. Specifically, the outer diameter liner and liner 46 would also be comprised of aluminum to facilitate brazing. The outer diameter liner would then be force fit into shaft 26A to accommodate differences in thermal expansion between shaft 26A, which is steel, and the aluminum heat transfer assembly. In such an embodiment, however, the advantages of having thermally conductive aluminum fins would have to be balanced with the lack of a metallurgical connection between the fins and shaft 26A.

Liner 46 provides structural support to loop 54. Liner 46 includes split 64, which allows the diameter of liner 46 to adjust to facilitate insertion of heat transfer assembly 14 into shaft 26A during initial fit-up and assembly. Split 64, in one embodiment, extends through liner 46 in a spiral or helical fashion with respect to center line CL. Split 64 also provides liner 46 with spring-like action when liner 46 is compressed during assembly such that liner 46 applies radially outward force to fin structure 44. The spring force maintains fin structure 44 in contact with shaft 26A, which expedites production of joints 60 and 62.

Rotor component 48A generates heat during operation of electric motor 12. The heat passes conductively into shaft 26A, fin structure 44 and liner 46. Metallurgical joints 60 and 62 provide highly conductive joints for efficient transfer of heat. Air A travels through passage 52 to remove heat originating from motor rotor 30. Fin structure 44 increases the surface with which cooling air A interacts. Loops 54 of fin structure 44 are thin such that numerous loops 54 can be densely packed within passage 52. In particular, the height of each loop 54 is many times greater than the thickness of the corrugated fin sheet comprising fin structure 44. This permits the density of loops 54 within passage 52 to be increased. The number of loops is at maximum density when sidewalls of adjacent loops 54 are touching at the interface with liner 46. The loops provide a significant increase in surface area over other types of heat transfer mechanisms, such as sleeves having annular base portions and thick radial fins and slots as is described in U.S. Pat. No. 7,791,238 to Pal et al., which is assigned to Hamilton Sundstrand Corporation and incorporated herein by reference. The increase in surface area provided by loops 54, however, does not unduly interfere with flow of air A through passage 52. Specifically, the thin nature of loops 54 does not obstruct passage 52 such that air A does not experience a large pressure drop. The number of loops 54 provided by fin structure 44 can be adjusted based on design needs. In one embodiment, a total of fifty four loops with heights of approximately 0.5 inches (~1.27 cm) are provided from a corrugated sheet having a thickness of 0.008 inches (~0.203 mm). Such a fin structure is used in a motor having a shaft inner diameter of approximately 1.48 inches (~3.76 cm) and a liner outer diameter of approximately 0.48 inches (~1.22 cm).

In the embodiment shown, loops 54 extend from liner 46 to shaft 26A in a true radial direction with respect to center line CL. For example, the position half-way between two adjacent troughs 56 is radially aligned with the center of a single crest 58, as shown by radius $R_1$. In such a configuration, troughs 56 are adjacent each other and crests 58 are spaced apart from each other such that loops 54 spread out in a fan-like pattern. Loops 54 that extend in a true radial direction provide rotational balance to motor rotor 30. In other embodiments, however, loops 54 may be adjusted to increase mechanical and thermal properties of heat transfer assembly 14.

Figure 3B:
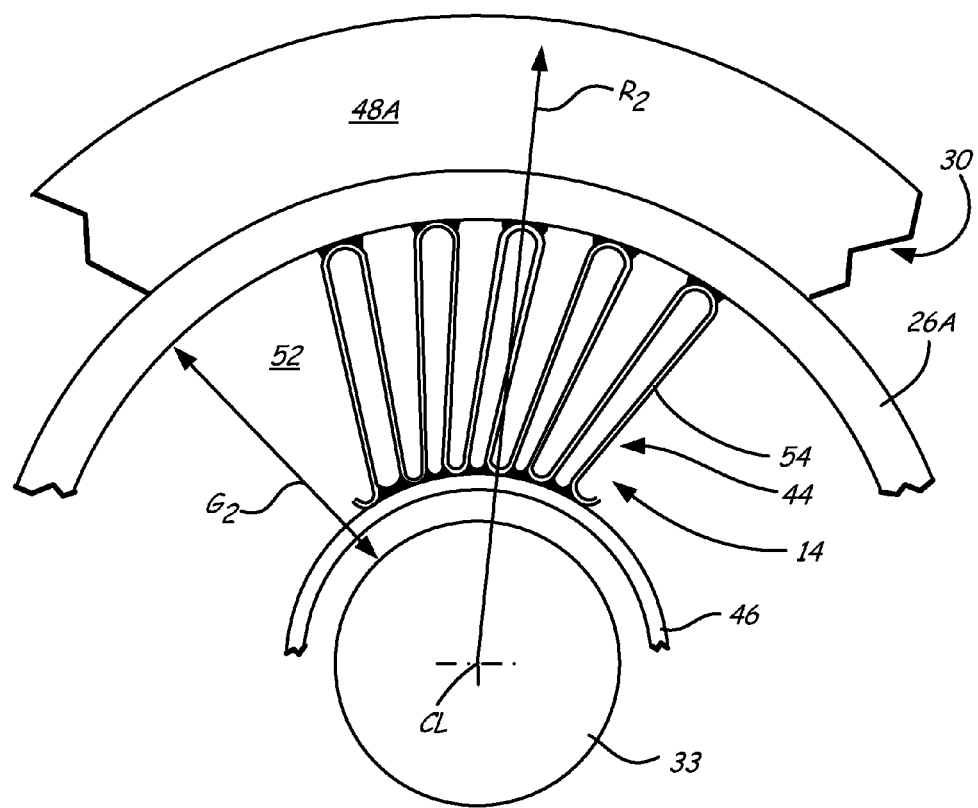
FIG. 3B is an alternative end view of the electric motor rotor of FIG. 2 in which corrugated fins of the heat transfer assembly are shown extending in a radially offset orientation.

FIG. 3B is an alternative end view of electric motor rotor 30 of FIG. 2 in which fin structure 44 of heat transfer assembly 14 is shown extending in a radially offset orientation. As can be seen in FIG. 3B, in one embodiment, loops 54 are offset in a clockwise direction. For example, the center of each trough 56 is radially aligned with the center of an adjacent crest 58, as shown by radius $R_2$. As such, crests 58 are offset by a only few degrees as compared to FIG. 3A. The exact amount, however, can vary based on design needs. Radially offset loops 54 allows fin structure 44 to compress or otherwise flex to absorb thermal expansions with heat transfer assembly 14. For example, shaft 26A and liner 46 may thermally grow in the radial direction, but at different rates. As liner 46 grows toward shaft 26A, loops 54 become further offset to permit relative movement between shaft 26A and liner 46.

Fin structure 44 comprises a sheet of material that is corrugated to form fins. Each fin is formed of a pair of sides and a crest 58 from a loop 54 and is disposed between two troughs 56. Such materials are commonly used in conventional air-cooled heat exchangers. The present invention utilizes such materials in a rolled configuration to form annular fin structure 44. As shown in FIGS. 3A and 3B, loops 54 of fin structure 44 extend axially along center line CL such that straight cooling passages are formed. In other embodiments, however, loops 54 can vary in the axial direction to provide other cooling or fluid flow performance improvements, as shown in FIGS. 4A and 4B.

Figure 4A:
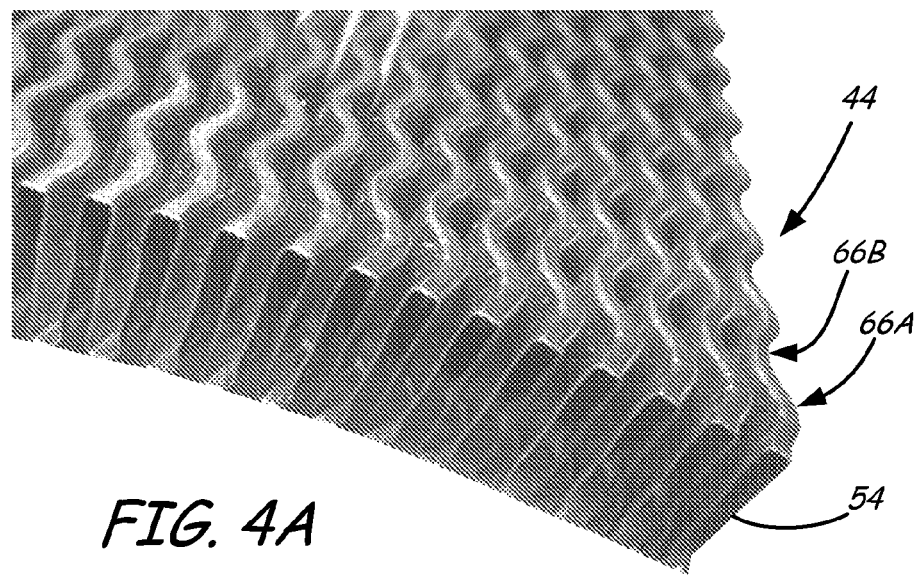
FIG. 4A is a perspective view of one embodiment of a corrugated sheet having ruffled fins that can be used as the corrugated fins of FIG. 3A or FIG. 3B.

FIG. 4A is a perspective view of one embodiment of fin structure 44 that can be used as loops 54 of FIG. 3A or FIG. 3B. In the embodiment of FIG. 4A, loops 54 comprise ruffled fins, as are known in the art. As loops 54 extend in the axial direction along center line CL, the sides of loops 54 undulate in a wave like pattern. Undulations 66A and 66B alternately extend the sides of loops 54 passed opposite sides of a central axis of loops 54 extending parallel to center line CL. The undulations increase the overall surface area and heat transfer film coefficient of fin structure 44, thereby improving heat transfer.

Figure 4B:
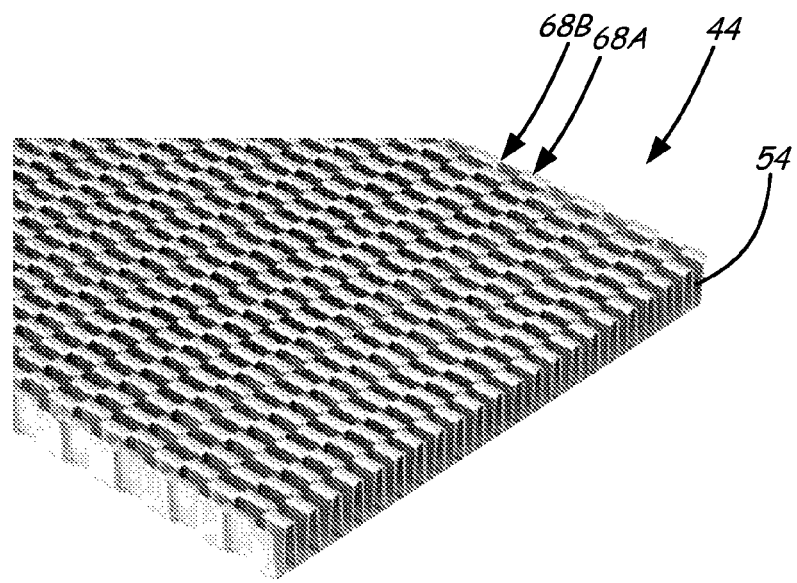
FIG. 4B is a perspective view of another embodiment of a corrugated fin sheet having lanced fins that can be used as the corrugated fins of FIG. 3A or FIG. 3B.

FIG. 4B is a perspective view of another embodiment of fin structure 44 that can be used as loops 54 of FIG. 3A or FIG. 3B. In the embodiment of FIG. 4B, loops 54 comprise lanced fins, as are known in the art. Loops 54 comprise rows 68A and 68B of circumferentially offset loops. Thus, a central axis of loops 54 of rows 68A aligns with a side wall of loops 54 of rows 68B. In such a configuration, loops 54 are ninety degrees out of phase with respect to troughs 56 and crests 58 of FIG. 3A, although other amounts of circumferential offset can be used. Offset rows 68A and 68B breakup the flow of air A, thereby improving heat transfer. Lanced fins, however, have higher heat transfer capability for a given pressure drop, but can be difficult to roll into an annulus for small diameter rotors.

The present invention provides improved cooling of all types of electric motors. In particular, motors in which air travels through a narrow passage alongside a rotor will experience improved cooling by the use of heat transfer assembly 14. Loops 54 of fin structure 44 provide increased wetted surface area for interacting with cooling air. Loops 54 improve conduction of heat from the motor rotor to the narrow passage where the cooling air flows. The large surface area of loops 54 allows the cooling air to more effectively remove heat via convection. The improved cooling of the motor allows for higher power densities, which reduces size and weight. Alternatively, operation of motors at cooler temperatures improves efficiency and extends operating life and reliability.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A motor driven assembly comprising:
    a motor shaft mounted for rotation about a rotational axis;
    a rotor located radially about the shaft;
    a passage extending through the rotor alongside the motor shaft;
    a corrugated fin heat transfer structure disposed within the passage radially aligned with the rotor; and
    a tie rod extending through the passage from a first end of the shaft to a second end of the shaft, the tie rod passing through the corrugated fin heat transfer structure and being supported by the first and second ends of the shaft.

2. The motor driven assembly of claim 1 wherein:
    the corrugated fin heat transfer structure comprises a sheet forming a plurality radially extending loops extending axially through the passage; and
    the plurality of radially extending loops comprise a plurality of undulations having radially outer crests and radially inner troughs.

3. The motor driven assembly of claim 2 wherein the radially outer crests are spaced apart from each other and the radially inner troughs are adjacent each other.

4. The motor driven assembly of claim 2 wherein the plurality of radially extending loops extend from the troughs to the crests in a direction offset from a true radial direction.

5. The motor driven assembly of claim 2 and further comprising:
    a liner positioned adjacent the troughs.

6. The motor driven assembly of claim 2 wherein the motor shaft is comprised of a first thermally conductive material and the sheet is comprised of a second different material.

7. The motor driven assembly of claim 2 wherein the plurality of radially extending loops of the sheet comprise a ruffled fin sheet rolled into an annular structure, wherein the plurality of loops extend in a wave pattern in a direction parallel to the rotational axis.

8. The motor driven assembly of claim 2 wherein the plurality of radially extending loops of the sheet comp rise a lanced fin sheet rolled into an annular structure, wherein the plurality of loops include axially adjacent sections that are offset from each other in a circumferential direction.

9. The motor driven assembly of claim 2 wherein the rotor comprises a magneto-electric drive component.

10. An electric motor comprising:
    a housing defining a duct, wherein the housing comprises:
        an inner housing;
        an outer housing disposed about an exterior of the inner housing to define the duct; and
        vanes connecting the inner and outer housings;
    a stator assembly mounted within the inner housing of the housing and comprising a magneto-electro drive component;

a shaft extending axially through the stator assembly and supported by the housing;

a rotor assembly mounted to the shaft and comprising a magneto-electric drive component;

a heat transfer fin positioned within the shaft and configured to draw heat from the rotor assembly; and a fan impeller connected to the shaft to drive a fluid through the duct.

11. The electric motor of claim 10 wherein the heat transfer fin comprises a corrugated fin sheet forming a plurality radially extending loops extending axially through the passage, wherein the plurality of loops comprise a plurality of undulations having radially outer crests and radially inner troughs.

12. The electric motor of claim 11 wherein the radially outer crests are spaced apart from each other and the radially inner troughs are adjacent each other.

13. The electric motor of claim 11 and further comprising:
a liner connected to the radially inward troughs; and
a tie rod extending through the liner and supported by the shaft.

14. The electric motor of claim 11 wherein the plurality of loops extend from the troughs to the crests in a direction offset from a true radial direction.

15. The electric motor of claim 11 wherein the corrugated fin sheet comprises a ruffled fin sheet rolled into an annular structure, wherein the plurality of loops extend in a wave pattern in an axial direction.

16. The electric motor of claim 11 wherein the corrugated fin sheet comprises a lanced fin sheet rolled into an annular structure, wherein the plurality of loops include axially adjacent sections that are offset from each other in a circumferential direction.

17. The electric motor of claim 10 wherein the fan impeller is connected to the shaft via an end cap.

18. The electric motor of claim 11 wherein the plurality of radially extending loops of the sheet are brazed to the rotor such that adjacent troughs are joined by a single joint.

19. A motor driven assembly comprising:
a motor shaft mounted for rotation about a rotational axis;
a rotor located radially about the shaft;
a passage extending through the rotor alongside the motor shaft;
a corrugated fin heat transfer structure disposed within the passage radially aligned with the rotor; and
a tie rod extending through the passage from a first end of the shaft to a second end of the shaft, the tie rod passing through the corrugated fin heat transfer structure and being supported by the first and second ends of the shaft;
wherein the corrugated fin heat transfer structure comprises a sheet forming a plurality radially extending loops extending axially through the passage; and
wherein the plurality of radially extending loops comprise a plurality of undulations having radially outer crests and radially inner troughs.

20. An electric motor comprising:
a housing;
a stator assembly mounted within the housing and comprising a magneto-electro drive component;
a shaft extending axially through the stator assembly and supported by the housing;
a rotor assembly mounted to the shaft and comprising a magneto-electric drive component;
a heat transfer fin positioned within the shaft and configured to draw heat from the rotor assembly, wherein the heat transfer fin comprises a corrugated fin sheet forming a plurality radially extending loops extending axially through the passage, wherein the plurality of loops comprise a plurality of undulations having radially outer crests and radially inner troughs;
a liner connected to the radially inward troughs; and
a tie rod extending through the liner and supported by the shaft.

* * * * *